(12) United States Patent  
Kalkanoglu et al.

(10) Patent No.: US 9,580,902 B2  
(45) Date of Patent: Feb. 28, 2017

(54) FIRE RESISTANT ROOFING PRODUCTS

(71) Applicants: Husnu M. Kalkanoglu, Swarthmore, PA (US); Barbara McDonough, Gilbertsville, PA (US)

(72) Inventors: Husnu M. Kalkanoglu, Swarthmore, PA (US); Barbara McDonough, Gilbertsville, PA (US)

(73) Assignee: CertainTeed Corporation, Malvern, PA (US)

( * ) Notice: Subject to any disclaimer, the term of this patent is extended or adjusted under 35 U.S.C. 154(b) by 194 days.

(21) Appl. No.: 14/319,032

(22) Filed: Jun. 30, 2014

(65) Prior Publication Data

US 2014/0338831 A1   Nov. 20, 2014

Related U.S. Application Data

(62) Division of application No. 12/056,766, filed on Mar. 27, 2008, now Pat. No. 8,802,215.

(Continued)

(51) Int. Cl.
*B32B 5/16* (2006.01)
*B32B 11/10* (2006.01)
(Continued)

(52) U.S. Cl.
CPC .......... *E04B 1/944* (2013.01); *B32B 5/022* (2013.01); *B32B 5/16* (2013.01); *B32B 11/08* (2013.01); *B32B 11/10* (2013.01); *B32B 11/12* (2013.01); *B32B 15/02* (2013.01); *B32B 15/14* (2013.01); *B32B 15/18* (2013.01); *B32B 15/20* (2013.01); *B32B 37/02* (2013.01); *B32B 37/24* (2013.01); *D06N 5/00* (2013.01); *D06N 5/003* (2013.01); *D06N 5/006* (2013.01); *E04D 3/35* (2013.01); *E04D 5/10* (2013.01); *B32B 37/12* (2013.01); *B32B 2037/243* (2013.01); *B32B 2038/008* (2013.01); *B32B 2309/02* (2013.01); *B32B 2309/105* (2013.01); *B32B 2419/06* (2013.01);
(Continued)

(58) Field of Classification Search
CPC  B32B 5/022; B32B 5/16; B32B 11/08; B32B 11/10; B32B 11/12; B32B 37/12; B32B 37/24; B32B 2419/06; B32B 15/02; B32B 15/14; B32B 15/18; B32B 15/20; B32B 2037/243; D06N 5/00; D06N 5/003; D06N 5/006; E04D 5/10; E04D 5/02; E04D 5/04

See application file for complete search history.

(56) References Cited

U.S. PATENT DOCUMENTS 3,297,461 A * 1/1967 Siddall ............... B05D 1/18
                                                245/8
3,783,000 A   1/1974 Hayashi et al.
(Continued)

FOREIGN PATENT DOCUMENTS

GB         1346721 A  * 2/1974
WO  WO 2007/015637 A1 * 2/2007

*Primary Examiner* — Michael Tolin
(74) *Attorney, Agent, or Firm* — Paul & Paul

(57) ABSTRACT

A fire resistant roofing material includes a core sheet and a sheet of conductive material having a thermal conductivity greater than about 25 W/m-K. The sheet of conductive material is coextensively bonded with the core sheet, and coated with a polymer-modified bituminous material having fire-resistant properties.

16 Claims, 2 Drawing Sheets

Related U.S. Application Data

(60) Provisional application No. 60/910,072, filed on Apr. 4, 2007.

(51) Int. Cl.
  *B32B 11/12* (2006.01)
  *B32B 15/14* (2006.01)
  *B32B 15/20* (2006.01)
  *B32B 37/12* (2006.01)
  *B32B 37/24* (2006.01)
  *E04D 5/10* (2006.01)
  *B32B 15/18* (2006.01)
  *E04B 1/94* (2006.01)
  *B32B 5/02* (2006.01)
  *B32B 11/08* (2006.01)
  *B32B 15/02* (2006.01)
  *D06N 5/00* (2006.01)
  *B32B 37/02* (2006.01)
  *E04D 3/35* (2006.01)
  *B32B 38/00* (2006.01)

(52) U.S. Cl.
  CPC .......... *Y10T 428/24355* (2015.01); *Y10T 428/24372* (2015.01)

(56) References Cited

U.S. PATENT DOCUMENTS

| | | | |
|---|---|---|---|
| 3,937,640 A | 2/1976 | Tajima et al. | |
| 4,276,342 A * | 6/1981 | Johnson | B32B 11/02 428/489 |
| 1,287,248 A | 9/1981 | Gessner et al. | |
| 1,473,610 A | 9/1984 | Davis | |
| 5,000,999 A | 3/1991 | Hollander | |
| 5,100,724 A * | 3/1992 | LaMarca, II | A47C 7/26 156/148 |
| 5,182,319 A | 1/1993 | Mitchell | |
| 5,456,785 A | 10/1995 | Venable | |
| 5,620,554 A | 4/1997 | Venable | |
| 5,633,064 A * | 5/1997 | Ragland | B32B 15/04 428/215 |
| 5,643,399 A | 7/1997 | Venable | |
| 6,192,650 B1 | 2/2001 | Kittson et al. | |
| 6,296,912 B1 | 10/2001 | Zickell | |
| 6,502,360 B2 | 1/2003 | Carr, III et al. | |
| 7,241,500 B2 | 7/2007 | Shiao et al. | |
| 2004/0009319 A1 | 1/2004 | Zanchetta et al. | |
| 2005/0072114 A1* | 4/2005 | Shiao | E04D 5/12 52/782.1 |

\* cited by examiner

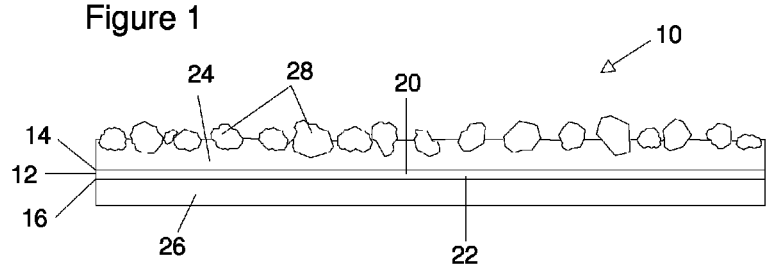
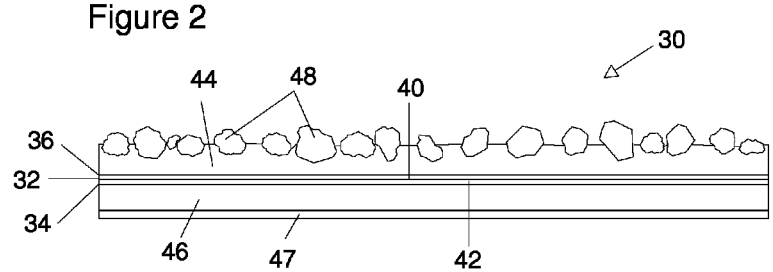
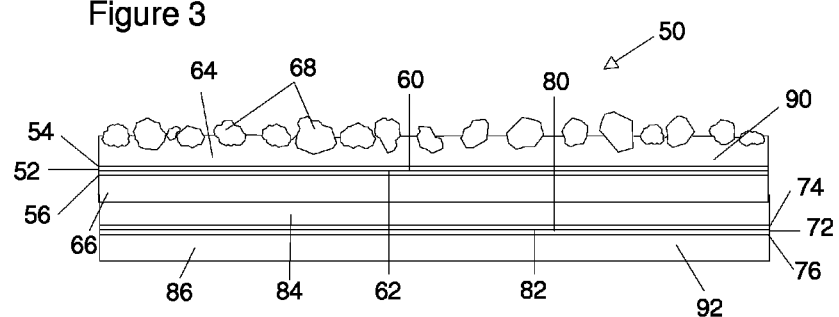

FIRE RESISTANT ROOFING PRODUCTS

CROSS-REFERENCE TO RELATED APPLICATIONS

This application is a division of U.S. patent application Ser. No. 12/056,766, filed Mar. 27, 2008, now U.S. Pat. No. 8,802,215, which claimed the priority of U.S. Provisional Application No. 60/910,072 filed Apr. 4, 2007.

BACKGROUND OF THE INVENTION

1. Field of the Invention

The present invention relates to bituminous roofing products such as asphalt-based roofing membranes and processes for making such roofing products.

2. Brief Description of the Prior Art

Asphalt-based roofing membranes are excellent waterproofing materials that have been extensively used in low-slope roofing systems to provide long-lasting and satisfactory roof coverings. Low-slope roofing systems are extensively used for commercial and industrial buildings. Examples of low-slope roofing systems are built-up roofs (BUR), modified bitumen roofs, and single-ply or membrane roofing systems. Asphalt-based roofing membranes are frequently used as waterproofing underlayment in low-rise roofing systems, as well as the uppermost or finish layer in built-up-roofs. Built-up roofs are sometimes covered with a layer of gravel or granular mineral material to protect the roofing membrane against mechanical damage.

Typically, bituminous roofing products are sheet goods that include a non-woven base or scrim formed of a fibrous material, such as a glass fiber mat. The base is coated with one or more layers of a bituminous material such as asphalt to provide water and weather resistance to the roofing product. Depending on the application, one side of the roofing product may be coated with mineral granules to provide durability, reflect heat and solar radiation, and to protect the bituminous binder from environmental degradation. Roofing granules can be embedded in the surface of such bituminous roofing products using conventional methods.

Mineral-surfaced asphalt shingles, such as those described in ASTM D225 or D3462, are generally used for steep-sloped roofs to provide water-shedding function while adding aesthetically pleasing appearance to the roofs. Conversely, roll goods such as asphalt-based roofing membranes are generally used for low-slope roofs. Pigment-coated mineral particles are commonly used as color granules in roofing applications to provide aesthetic as well as protective functions. Roofing granules are generally used in asphalt shingles or in roofing membranes to protect asphalt from harmful ultraviolet radiation.

Roofing products such as asphalt shingles and roll stock are typically composite articles including a non-woven glass fiber or felt web covered with a coating of water repellent bituminous material, and optionally surfaced with protective mineral-based roofing granules.

Asphalt based roofing products have the challenge of meeting demanding fire resistance requirements set forth by national and international codes. One way in which fire resistance is improved is by adding fire retardant chemicals to the asphaltic materials. Another way in which fire resistance can be improved is by coating roofing products with coatings compositions including fire retardant chemicals.

For example, a self-adhesive roofing membrane can consist of a polyester mat that has been coated on its upper side with polymer-modified asphalt. The fire resistance of the polymer-modified asphalt coating can be increased by including limestone fillers, or fire retardant chemicals, depending on the fire resistance requirement. The under side of the polyester mat can include a polymer-modified asphalt coating that has been further modified with various tackifying resins and plasticizing oils to become self-adhesive. In addition, the lower layer may contain limestone filler, or fire resistance chemicals. However, such materials are usually used sparingly because they tend to reduce the adhesive properties of the bottom layer. Self-adhesive roofing membranes are usually applied over other layers of roofing membrane to provide roofs with long lasting protection against water leakage.

The fire resistance properties of roofing systems are typically measured using Underwriters' Laboratories 790 test method, Tests for Fire Resistance of Roof Covering Materials, which includes three test procedures, spread of flame, intermittent flame, and burning brand tests. This test employs a roof deck that slopes upward from the source of flame. When exposed to vigorous flames and high temperatures, the asphalt coating and the polyester mat of a typical self adhesive roofing membrane start burning and melting. In addition, the bottom coating of the product in the example melts particularly quickly reflecting the presence of various tackifying resins and plasticizing oils which render the layer self-adhesive. Even when this layer contains fire resistance chemicals melting of asphalt does occur. When this happens, molten asphalt starts running downward towards the flame and catches on fire dribbling from the edges while burning. This behavior constitutes a failure as far as UL790 is concerned. It would be advantageous if the bottom layer could be divorced from the flames, and kept isolated.

Laminated single-ply roofing membranes are known, such as those disclosed in U.S. Pat. Nos. 6,502,360; 5,456,785; 5,620,554; and 5,643,399. U.S. Pat. No. 6,296,912 discloses a roofing membrane having a fibrous layer on top for providing a secure surface for roof installation personnel.

Multilayer roofing membranes reinforced with polymeric materials are known. Such membranes are available, for example, faced with polyethylene film, or with mineral particles bonded to an underlying polyethylene film.

U.S. Pat. No. 4,287,248 discloses a bituminized roofing sheet with improved flame resistance. The roofing sheet consists of a reinforced fleece, bitumen, and a metal foil placed on one face of the sheet. U.S. Pat. No. 5,000,999 discloses a bituminized roofing sheet having a metal foil applied to the bottom of the lower layer and optionally to the upper surface of the roofing sheet.

There is a continuing need for roofing materials that have improved resistance to fire while providing good weatherproofing characteristics. In addition, there is a continuing need to provide improved resistance to fire while reducing the addition of expensive fire resistance chemicals.

SUMMARY OF THE INVENTION

The present invention provides an improved fire resistant roofing material comprising a plurality of layers. In a first presently preferred embodiment the plurality of layers comprises a core sheet having a top surface and bottom surface; and a sheet of conductive material having a thermal conductivity greater than about 25 W/m-K, such as a suitable metal foil, having a first and second surface. The first surface of the sheet of conductive material is coextensively bonded with the top surface of the core sheet. In this embodiment, the second surface of the sheet of conductive material is coated with a polymer-modified bituminous material optionally having fire-resistant properties forming a top bituminous layer and the bottom surface of the core sheet is impregnated with an optionally non-fire-resistant polymer-modified bituminous material forming a bottom bituminous layer. Further, in this embodiment, roofing granules are optionally embedded in at least a portion of said top bituminous layer. Preferably, core sheet comprises a non-woven mat. The core sheet and the sheet of thermally conductive material can be bonded with an adhesive. In the alternative, the core sheet and the sheet of thermally conductive material can be mechanically bonded via needle puncturing. Preferably, the core sheet comprises a reinforcing means for added dimensional stability.

In a second presently preferred embodiment, the present invention also provides a fire resistant roofing material comprising a plurality of layers, wherein the plurality of layers comprises a core sheet having a top surface and bottom surface; and a sheet of conductive material having a thermal conductivity greater than about 25 W/m-K, such as a suitable metal foil, having a first and second surface. However, in this second embodiment, the first surface of the sheet of conductive material is coextensively bonded with said bottom surface of the core sheet. The second surface of the sheet of conductive material is coated with a polymer-modified bituminous material having optionally non-fire-resistant properties forming a bottom bituminous layer and the top surface of the core sheet is impregnated with a polymer-modified bituminous material optionally having fire-resistant properties forming a top bituminous layer. Further, in this embodiment roofing granules are also optionally embedded in at least a portion of said top bituminous layer. Preferably, the core sheet comprises a non-woven mat. In one aspect, the core sheet and the sheet of conductive material are bonded with an adhesive. In another aspect, the core sheet and the sheet of conductive material are mechanically bonded via needle puncturing. Preferably, the core sheet comprises a reinforcing means for added dimensional stability.

In another aspect, the present invention provides a roof covering comprising a plurality of successive courses of roof covering materials including an uppermost course, wherein at least one course comprises a fire resistant material according to the first or the second embodiment of fire resistant roofing material according to the present invention. Preferably, roofing granules are embedded in at least a portion of the top bituminous layer of the uppermost course of roof covering material.

Thus, in one embodiment, the present invention provides a roofing covering comprising a plurality of successive courses of fire resistant material including an uppermost course, the fire resistant material comprising a core sheet having a top surface and bottom surface; and a sheet of conductive material having a thermal conductivity greater than about 25 W/m-K, such as a suitable metal foil, having a first and second surface, wherein the first surface of the sheet of the conductive material is coextensively bonded with said top surface of the core sheet, and wherein the second surface of the sheet of conductive material is coated with a polymer-modified bituminous material having fire-resistant properties forming a top bituminous layer and the bottom surface of the core sheet is impregnated with polymer-modified bituminous material having non-fire-resistant properties forming a bottom bituminous layer. Preferably, roofing granules are embedded in at least a portion of the top bituminous layer of the uppermost course of fire resistant material. Preferably, the core sheet comprises a non-woven mat. The core sheet and the sheet of conductive material can be bonded with an adhesive, or mechanically via needle puncturing. Preferably, the core sheet comprises a reinforcing means for added dimensional stability.

Similarly, in another embodiment, the present invention provides a roof covering comprising a plurality of successive courses of a fire resistant material including an uppermost course, the fire resistant material comprising a core sheet having a top surface and bottom surface; and a sheet of conductive material having a thermal conductivity greater than about 25 W/m-K, such as a suitable metal foil, having a first and second surface; wherein the first surface of the sheet of conductive material is coextensively bonded with said bottom surface of the core sheet, and wherein the second surface of the sheet of conductive material is impregnated with a polymer-modified bituminous material having non-fire-resistant properties forming a bottom bituminous layer and the top surface of the core sheet is impregnated with a polymer-modified bituminous material having fire-resistant properties forming a top bituminous layer. Preferably, roofing granules are embedded in at least a portion of the top bituminous layer of the uppermost course of fire resistant material. Preferably, said core sheet comprises a non-woven mat. The core sheet and the sheet of conductive material can be bonded with an adhesive, or in one alternative, the core sheet and the sheet of conductive material can be mechanically bonded via needle puncturing. Preferably, the core sheet comprises a reinforcing means for added dimensional stability.

The present invention also provides a method of producing a fire resistant material. In a first embodiment, this method includes continuously advancing an indefinite length of a core sheet having a top surface and a bottom surface and a sheet of conductive material having a thermal conductivity greater than about 25 W/m-K, such as a suitable metal foil, having a first surface and a second surface. The method further includes coextensively bonding the first surface of the sheet of conductive material to the top surface of the core sheet. The method also includes forming a top bituminous layer by applying a polymer-modified bituminous material having fire-resistant properties to the second surface of the sheet of conductive material and forming a bottom bituminous layer by applying a polymer-modified bituminous material having non-fire-resistant properties to the bottom surface of the core sheet. The method optionally includes embedding granules in at least a portion of the top bituminous layer. Preferably, the core sheet comprises a non-woven mat. The core sheet and the sheet of conductive material can be bonded with an adhesive, or, in one alternative, the core sheet and the sheet of conductive material can be bonded mechanically via needle puncturing. Preferably, the core sheet comprises a reinforcing means for added dimensional stability.

In a second embodiment, this method includes continuously advancing an indefinite length of a core sheet having a top surface and a bottom surface and a sheet of conductive material having a thermal conductivity greater than about 25 W/m-K, such as a suitable metal foil, having a first surface and a second surface, and coextensively bonding the first surface of the sheet of conductive material to the bottom surface of the core sheet. In this embodiment, the method also includes forming a bottom bituminous layer by applying a polymer-modified bituminous material having non-fire-resistant properties to the second surface of the sheet of conductive material and forming a top bituminous layer by applying a polymer-modified bituminous material having fire resistant properties to the top surface of the core sheet.

Optionally, the method also includes embedding granules in at least a portion of the top bituminous layer. Preferably, the core sheet comprises a non-woven mat. The core sheet and the sheet of conductive material can be bonded with an adhesive, or in one alternative, the core sheet and the sheet of conductive material can be mechanically bonded via needle puncturing. Preferably, the core sheet comprises a reinforcing means for added dimensional stability.

BRIEF DESCRIPTION OF THE DRAWINGS

FIG. 1 is a schematic sectional elevation view of an improved fire resistant roofing material according to a first embodiment of the present invention.

FIG. 2 is a schematic sectional elevation view of an improved fire resistant roofing material according to a second embodiment of the present invention.

FIG. 3 is a schematic sectional elevation view of an improved fire resistant roofing material according to a third embodiment of the present invention.

DETAILED DESCRIPTION

Figure 4:
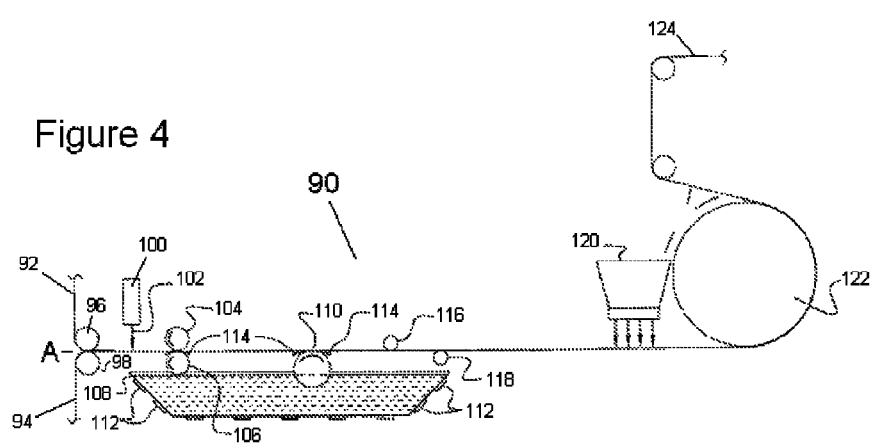
FIG. 4 is a schematic sectional elevation view of a process for preparing an improved fire resistant roofing material according to the present invention.

The present invention provides improved fire resistance to asphalt-based roofing materials, and in particular to self-adhesive roofing membranes by incorporating a nonwoven mat which has a fire barrier layer fused on at least one side of the mat.

Roof coverings according to the present invention can include a single multi-layer roofing sheet or membrane or can include several courses of roofing membranes, provided at least one multi-layer roofing sheet according to the present invention is employed. Such roof coverings can be formed from partially overlapping courses in which a previously applied roofing membrane is partially covered by a successively applied roofing membrane. Alternatively, one or more successive courses of roofing membranes can be applied to completely cover or overlap a previously course.

Referring now to the drawings, in which like reference numerals refer to like elements in each of the several views, there are shown schematically in FIGS. 1, 2, and 3 examples of multilayer roofing sheets according to the present invention.

FIG. 1 is a schematic cross-sectional representation of a first embodiment of multi-layer roofing sheet 10 according to the present invention. In a first presently preferred embodiment the multi-layer roofing sheet 10 comprises a core sheet 22 having a top surface 12 and bottom surface 16; and a sheet of conductive material, a suitable metal foil 20 such as a copper foil or aluminum foil, having a first surface and an opposing second surface 14. The sheet of conductive material preferably has a thermal conductivity greater than about 25 W/m-K. The core sheet 22 is preferably made of a non-woven mat and its purpose is to provide added strength to the multi-layer roofing sheet when it is applied to a roof and installed using fasteners such as nails.

The first surface of the sheet of conductive material 20 is coextensively bonded with the top surface 12 of the core sheet 22. The sheet of conductive material is preferably made of aluminum; however any metal sheet material having a thermal conductivity greater than about 25 W/m-K may be used as is known in the art, such as copper or tin foil. Aluminum is advantageous due to its low cost, but other metal foils may be desirable for other qualities, such as higher heat dissipation. It is important that appropriate materials are selected for the core sheet and conductive material as materials that vary greatly in thermal expansion and contraction due to exposure to the changing seasons and weather may disrupt the bond between the two layers. In this embodiment, the second surface 14 of the sheet of conductive material is coated or impregnated with a polymer-modified bituminous material having fire-resistant properties forming a top bituminous layer 24 and the bottom surface 16 of the core sheet is impregnated with a non-fire-resistant polymer-modified bituminous material forming a bottom bituminous layer 26. It is preferred that the core sheet 22 is of a mesh design to facilitate the ability of the bituminous material to penetrate and adhere to the core sheet 22. Further, in this embodiment, roofing granules 28 are optionally embedded in at least a portion of said top bituminous layer 24. The granules may be of different types and selections, to yield different shading, sizing, and/or color arrangements. The core sheet 22 and the sheet of conductive material 20 can be bonded with an adhesive. In the alternative, the core sheet 22 and the sheet of conductive material 20 can be mechanically bonded via needle puncturing. Preferably, the core sheet 22 comprises a reinforcing means for added dimensional stability.

The multi-layer roofing sheet provides a fire resistant product by inserting a barrier between the top and bottom bituminous layer of the roofing sheet. The fire retardant chemicals added to the top bituminous layer would slow down the burning process, and because flames would occur first in the top coating the conductive material layer provides protection to the cover sheet and bottom coating by creating a barrier. The bottom bituminous layer is often softer and more pliable and tacky than the top bituminous layer because of higher oil content. Although these properties make an excellent adhesive layer, the high oil content creates a more flammable layer which is often remedied by adding fire retardant chemicals. By using the conductive material divorcing layer, it is possible to eliminate (or reduce) FR chemicals from the self-adhesive bottom bituminous layer which may impair the adhesive properties of the bottom layer. The metal foil isolates the bottom bituminous layer by eliminating contact with direct flames, thus preventing the spread of a fire on a roof. It is also preferable to select a thickness for the sheet of conductive material such that the layer will dissipate heat and limit the exposure of the bottom bituminous layer to temperatures below its melting point. The fire resistant properties added by using the conductive material layer enable the manufacture of a roofing product that meets the stringent fire resistance requirements set forth by national and international codes without requiring the use of expensive fire retardant chemicals Referring now to FIG. 2, a schematic cross-sectional representation of a second embodiment of multi-layer roofing sheet 30 according to the present invention is presented. The second embodiment is similar to the first embodiment, except that the second embodiment comprises a conductive material or metal foil layer 42 which is coextensively bonded below a core sheet 40. The core sheet 40 has a top surface 36 and a bottom surface 32. The bottom surface 32 is bonded to a first surface of the metal foil layer 42 which has a second surface 34 opposing the first surface. A top bituminous layer 44 and bottom bituminous layer 46 are bonded to the top surface 36 and second surface 34, respectively. In this embodiment, roofing granules 48 are optionally embedded in at least a portion of said top bituminous layer 44. The bottom bituminous layer 46 will optionally have a releasable backing sheet 47, which is not limited to the second embodiment of the invention. The backing sheet facilitates the ability to produce and ship a long roll of the multi-layer roofing sheet. The releasable backing sheet 47 should be easily removed during installation.

Referring now to FIG. 3, a third embodiment of the present invention is shown, a roof covering 50 comprising a plurality of successive courses of roof covering materials including an uppermost course, wherein at least one course comprises a fire resistant material according to the first or the second embodiment of fire resistant roofing material according to the present invention. In the illustrated embodiment, the first course comprises a first multi-layer roofing sheet 90 comprising a core sheet 62 having a top surface 52 and bottom surface 56; and a sheet of conductive material, a suitable metal foil 60 such as a copper foil or aluminum foil, having a first surface and an opposing second surface 54. The sheet of conductive material preferably has a thermal conductivity greater than about 25 W/m-K. The core sheet 62 is preferably made of a non-woven mat to provide added strength to the first multi-layer roofing sheet 90. The first surface of the sheet of conductive material 60 is coextensively bonded with the top surface 52 of the core sheet 62. The sheet of conductive material is preferably made of aluminum. In this embodiment, the second surface 54 of the sheet of conductive material is coated or impregnated with a polymer-modified bituminous material having fire-resistant properties forming a top bituminous layer 64 and the bottom surface 56 of the core sheet 62 is impregnated with a non-fire-resistant polymer-modified bituminous material forming a bottom bituminous layer 66. It is preferred that the core sheet 62 is of a mesh design to facilitate the ability of the bituminous material to penetrate and adhere to the core sheet 62. Further, in this embodiment, roofing granules 68 are optionally embedded in at least a portion of said top bituminous layer 64. The granules 68 may be of different types and selections, to yield different shading, sizing, and/or color arrangements. The core sheet 62 and the sheet of conductive material 60 can be bonded with an adhesive. In the alternative, the core sheet 62 and the sheet of conductive material 60 can be mechanically bonded via needle puncturing. The roof covering 50 also includes second or lower course comprising a second multi-layer roofing sheet 92 comprising a core sheet 82 having a top surface 72 and bottom surface 76; and a sheet of conductive material, a suitable metal foil 80 such as a copper foil or aluminum foil, having a first surface and an opposing second surface 74. The sheet of conductive material preferably has a thermal conductivity greater than about 25 W/m-K. The core sheet 82 is preferably made of a non-woven mat to provide added strength to the second multi-layer roofing sheet 92. The first surface of the sheet of conductive material 80 is coextensively bonded with the top surface 72 of the core sheet 82. The sheet of conductive material is preferably made of aluminum. In this embodiment, the second surface 74 of the sheet of conductive material is coated or impregnated with a polymer-modified bituminous material forming a top bituminous layer 84 and the bottom surface 76 of the core sheet 82 is impregnated with a non-fire-resistant polymer-modified bituminous material having fire-resistant properties forming a bottom bituminous layer 86. It is preferred that the core sheet 82 is of a mesh design to facilitate the ability of the bituminous material to penetrate and adhere to the core sheet 82. The core sheet 82 and the sheet of conductive material 80 can be bonded with an adhesive. In this third embodiment, the first multi-layer roofing sheet 90 and the second multi-layer roofing sheet 92 are bonded with an adhesive material.

The successive courses of multi-layer roofing material may also be comprised of both the first and second embodiment of the present invention. The successive courses of the multi-layer roofing material are applied to the roof or other surface by first applying a first course substantially parallel to the edge of the surface to be covered. If the multi-layer roofing material includes a backing sheet, the multi-layer roofing material should be folded back to remove the releasable backing sheet and expose the adhesive bottom bituminous layer to adhere to the surface to be covered. Additional fasteners, such as nails, screws, or the like can also be used to secure the multi-layer roofing material to the surface to be covered by driving the fasteners through the roofing material and into the surface below.

The subsequent course of multi-layer roofing material can then be aligned with the first course already in place. The second course preferably overlaps at least a portion of the first course. Once aligned, the subsequent course is adhered to the surface to be covered in the same fashion as the first course, by removing a backing sheet if present and optionally using additional fasteners to secure the second course in place.

This process can be repeated until the entire roof or other surface has been covered with overlapping courses of multi-layer roofing material. Preferably, roofing granules are embedded in at least a portion of the top bituminous layer of the uppermost course of roof covering material.

Preferably, the top or outside surface of the multilayer roofing sheet provides special functionality to the roofing sheet, such as weatherability, solar reflectivity, color, aesthetics, mechanical performance features such as wear resistance, skid resistance, and the like. Solar reflectivity is particularly preferred.

The conductive material can be any thermally conductive material having a thermal conductivity greater than about 25 W/m-K. Examples of suitable conductive material include copper foil, aluminum foil, steel foil, aluminum wire mesh, copper wire mesh, steel wire mesh, nonwoven mats of metal wire such as steel wool, or other metal wool. Preferably, the sheet of conductive material has a thickness of at least about 0.5 mil, more preferably at least about 2 mils, and still more preferably at least about 4 mils. Preferably, the product of the thermal conductivity and the effective thickness of the thermally conductive material is greater than about $3 \times 10^{-4}$ W/K. By effective thickness is meant the sum of material cross-sectional area(s) taken in a plane perpendicular to the surface of the sheet, divided by the width of the cross-section. Thus, for a wire mesh, the effective thickness is the sum of the cross-sections of the individual wires divided by the width of the cross-section of the mesh.

The bituminous material used in manufacturing roofing products according to the present invention is derived from a petroleum processing by-product such as pitch, "straight-run" bitumen, or "blown" bitumen. The bituminous material can be modified with extender materials such as oils, petroleum extracts, and/or petroleum residues. The bituminous material can include various modifying ingredients such as polymeric materials, such as SBS (styrene-butadiene-styrene) block copolymers, resins, oils, flame-retardant materials, oils, stabilizing materials, anti-static compounds, and the like. Preferably, the total amount by weight of such modifying ingredients is not more than about 15 percent of the total weight of the bituminous material. The bituminous material can also include amorphous polyolefins, up to about 25 percent by weight. Examples of suitable amorphous polyolefins include atactic polypropylene, ethylene-propylene rubber, etc. Preferably, the amorphous polyolefins employed have a softening point of from about 130 degrees C. to about 160 degrees C. The bituminous composition can also include a suitable filler, such as calcium carbonate, talc, carbon black, stone dust, or fly ash, preferably in an amount from about 10 percent to 70 percent by weight of the bituminous composite material.

The bituminous material can optionally include one or more fire retardant or fire resistant materials. Examples of fire retardant materials include aluminum trihydrate, magnesium trioxide, antimony trioxide, antimony pentoxide, decabromodiphenyloxide, phosphates such as alkali metal phosphates, alkaline earth metal phosphates, ammonium phosphates, such as monoammonium phosphate and diammonium phosphate, borates such as borax, bromated phosphorous complex, and halogenated hydrocarbons such as halogenated paraffin.

The multi-layer roofing material is not limited to the first and second embodiment previously disclosed. The fire resistant layer of conductive material bonded to a core sheet can be incorporated into other membranes making up a roofing system for sloped roofs or in membranes used in a built up roof. The present invention would also be beneficial in membranes that do not contain a self-adhering layer to increase fire retardant properties. Other materials may be added as layers bonded to the laminated core sheet and conductive material layer, such as layers of polymeric material to enhance the properties of the multi-layer roofing material, such as added strength, durability, or fire resistance.

The core sheet can be prepared by any suitable technique known in the art. Acceptable materials for use as a core sheet include reinforced polyester mesh, flashing fabric, a nonwoven scrim of polypropylene fibers, or other synthetic fabric as is known in the art. The core sheet preferably includes a nonwoven mat with reinforcement strands for added dimensional stability, for example, a glass reinforced scrim manufactured by Johns Manville®.

Bituminous roofing products are typically manufactured in continuous processes in which a continuous substrate sheet of a fibrous material such as a continuous felt sheet or glass fiber mat is immersed in a bath of hot, fluid bituminous coating material so that the bituminous material saturates the substrate sheet and coats at least one side of the substrate. Such processes can be employed to form the core sheet of the multilayer roofing products of the present invention. Modifications of such processes can be employed to apply the metal foil layer and additional layer of bituminous material.

Conventional roofing production processes can be employed in the manufacture of multilayer roofing sheets of the present invention as depicted in FIG. 4. A sheet of non-woven material 92 and a sheet of metal foil 94 are bonded at point A. The method of bonding could be performed using an adhesive or mechanical bonding, such as needle puncturing (not shown). Alternatively, the feed of the non-woven material and metal foil can be reversed in the process 90, such that the metal foil is bonded to the top surface of the non-woven material, rather than the bottom surface. The bonded sheets are then fed between a pair of tension rollers 96 and 98 for uniform tensioning and passed to a station for the application of a bituminous layer. Discharge pipe 100 supplies a layer of the bitumen 102 to the upper surface of the bonded sheets just before the nip of rotating rolls 104 and 106. It is preferred that the bitumen 102 applied to the top surface of the bonded sheets include a fire retardant chemical as an additive. A reservoir 108 is placed below the coating area to capture runover bitumen from the operation for application to the sheet by back coating roll 110 immersed in the reservoir 108. Nip rolls 104 and 106 coact to apply and meter the appropriate weight of bitumen to the bonded sheets, with the nip of the rolls providing pressure to ensure that the bitumen has impregnated the sheet properly. Heating units 112 keep the coating asphalt at the proper temperature for application. The bonded sheets may be subjected to single treatment of bitumen on only one side if desired.

Excess bitumen is advantageously wiped from the surface of the nip roll 106 and back coating roll 110 by a doctor knife 114 or the like, installed on either or both sides of the nip roll 106 and the back coating roll 110 to ensure uniform application and avoid excesses of the bitumen. Downstream of the back coating application there is a doctor blade or knife 114 or the like which removes excess coating from the back or under surface of bonded sheets. The bonded sheets are further acted upon by a smoothing roll 116 and a carrier roll 118, which rolls are generally heated.

Stabilized bitumen coating 102 suitably has a softening point as measured by ASTM D36 of from about 195 degrees F. to 260 degrees F., more preferably from about 215 degrees F. to 235 degrees F. The coating is advantageously maintained at about 380 degrees F. to 450 degrees F. before application to the sheet.

A releasable backing sheet (not shown) may be applied at any point following the coating step. After the coating step and while the coating material is still hot, soft and tacky, the bonded sheets pass beneath surfacing apparatus 120 from which decorative granules are deposited on the upper surface of the sheet. Apparatus 120 includes a bin filled with mineral granules and positioned above the longitudinally moving sheets. This known type of roofing machinery is equipped for selectively depositing the mineral granules contained in the bins onto the adhesive upper surface of the bonded sheets.

After the stream of granules is discharged from apparatus 120 onto the bonded sheets, the sheet goes around a slate drum 122 which functions to embed the granular material in the top asphalt coating. In the continued passage of the bonded sheets, excess granules fall off from the sheet into apparatus 120 from which they are reapplied onto the sheet. The final product, multi-layer roofing material 124, is then cooled and optionally wrapped into rolls for shipping.

Various modifications can be made in the details of the various embodiments of the processes, compositions and articles of the present invention, all within the scope and spirit of the invention and defined by the appended claims.

The invention claimed is:

1. A method of producing a fire resistant material comprising the steps of:
   (a) continuously advancing an indefinite length of a core sheet having a top surface and a bottom surface and a sheet of conductive material selected from the group consisting of aluminum wire mesh, copper wire mesh, steel wire mesh, and nonwoven mats of metal wire, having a first surface and a second surface,
   (b) coextensively bonding the first surface of the sheet of conductive material to a first predetermined surface of the core sheet,
   (c) forming a first predetermined bituminous layer by applying a first polymer-modified bituminous material having fire-resistant properties to the second surface of the sheet of conductive material and forming a second predetermined bituminous layer by applying a second polymer-modified bituminous material having non-fire-resistant properties and a higher oil content than the first polymer-modified bituminous material to a second predetermined surface of the core sheet, the first bituminous layer and the second bituminous layer providing a top bituminous layer and a bottom bituminous layer, and (d) embedding granules in at least a portion of the top bituminous layer.

2. A method of producing fire resistant material according to claim 1 wherein the first predetermined surface of the core sheet is the top surface of the core sheet, the second predetermined surface of the core sheet is the bottom surface of the core sheet, the first predetermined bituminous layer is the top bituminous layer, and the second predetermined bituminous layer is the bottom bituminous layer.

3. A method of producing a fire resistant material according to claim 1, wherein said core sheet comprises a non-woven mat.

4. A method of producing a fire resistant material according to claim 1, wherein the core sheet and the sheet of conductive material are bonded with an adhesive.

5. A method of producing a fire resistant material according to claim 1, wherein the core sheet and the sheet of conductive material are bonded via needle puncturing.

6. A method of producing a fire resistant material according to claim 1, wherein the sheet of conductive material has a thermal conductivity greater than about 25 W/m-K.

7. A method of producing a fire resistant material according to claim 1, wherein the granules embedded in the top bituminous layer form a top surface, the top surface providing solar reflectivity.

8. A method of producing a fire resistant material comprising the steps of:

(a) continuously advancing an indefinite length of a core sheet having a top surface and a bottom surface and a sheet of conductive material selected from the group consisting of aluminum wire mesh, copper wire mesh, steel wire mesh, and nonwoven mats of metal wire, having a first surface and a second surface, (b) coextensively bonding the first surface of the sheet of conductive material to a first predetermined surface of the core sheet, (c) forming a first bituminous layer by applying a first polymer-modified bituminous material to the second surface of the sheet of conductive material and forming a second bituminous layer by applying a second polymer-modified bituminous material having a higher oil content than the first polymer modified material to a second predetermined surface of the core sheet, the first bituminous layer and the second bituminous layer providing a top bituminous layer and a bottom bituminous layer, and (d) embedding granules in at least a portion of the top bituminous layer.

9. A method of producing a fire resistant material according to claim 8, wherein the granules embedded in the top bituminous layer form a top surface, the top surface providing solar reflectivity.

10. A method of producing a fire resistant material according to claim 8, wherein the first polymer-modified bituminous material has fire-resistant properties.

11. A method of producing a fire resistant material according to claim 8, wherein the second polymer-modified bituminous material has non-fire-resistant properties.

12. A method of producing a fire resistant material according to claim 8, wherein said core sheet comprises a non-woven mat.

13. A method of producing a fire resistant material according to claim 8, wherein the core sheet and the sheet of conductive material are bonded with an adhesive.

14. A method of producing a fire resistant material comprising the steps of:

(a) continuously advancing an indefinite length of a core sheet having a top surface and a bottom surface and a sheet of conductive material selected from the group consisting of aluminum wire mesh, copper wire mesh, steel wire mesh, and nonwoven mats of metal wire, and having a thermal conductivity greater than about 25 W/m-K and having a first surface and a second surface, (b) coextensively bonding the first surface of the sheet of conductive material to a first predetermined surface of the core sheet, (c) forming a first bituminous layer by applying a first polymer-modified bituminous material to the second surface of the sheet of conductive material and forming a second bituminous layer by applying a second polymer-modified bituminous material having a higher oil content than the first polymer modified material to a second predetermined surface of the core sheet, the first bituminous layer and the second bituminous layer providing a top bituminous layer and a bottom bituminous layer, and (d) embedding granules in at least a portion of the top bituminous layer.

15. A method of producing a fire resistant material according to claim 14, wherein the first polymer-modified bituminous material has fire-resistant properties.

16. A method of producing a fire resistant material according to claim 14, wherein the granules embedded in the top bituminous layer form a top surface, the top surface providing solar reflectivity.

* * * * *